(12) United States Patent
Feick

(10) Patent No.: US 7,320,588 B2
(45) Date of Patent: Jan. 22, 2008

(54) DISTRIBUTION ASSEMBLY FOR AN INJECTION MOLDING APPARATUS

(75) Inventor: Murray Feick, Kitchener (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 260 days.

(21) Appl. No.: 11/247,155

(22) Filed: Oct. 12, 2005

(65) Prior Publication Data

US 2007/0082081 A1   Apr. 12, 2007

(51) Int. Cl.
B29C 45/23 (2006.01)
(52) U.S. Cl. .................. 425/564; 425/566; 425/572
(58) Field of Classification Search ................ 425/562, 425/563, 564, 565, 566, 572
See application file for complete search history.

(56) References Cited

U.S. PATENT DOCUMENTS

| | | | |
|---|---|---|---|
| 3,024,498 A | 3/1962 | Bronnenkant et al. | |
| 4,082,324 A | 4/1978 | Obrecht | |
| 4,213,751 A | 7/1980 | Fernandez | |
| 4,279,582 A | 7/1981 | Osuna-Diaz | |
| 4,468,191 A | 8/1984 | Gellert | |
| 4,888,252 A | 12/1989 | Kilim | |
| 5,007,821 A | 4/1991 | Schmidt | |
| 5,022,846 A | 6/1991 | Schmidt | |
| 5,030,084 A | 7/1991 | Gellert et al. | |
| 5,032,078 A | 7/1991 | Benenati | |
| 5,227,179 A * | 7/1993 | Benenati | 425/572 |
| 5,320,511 A * | 6/1994 | Woerner | 425/572 |
| 5,320,513 A * | 6/1994 | Schmidt | 425/570 |
| 5,352,109 A | 10/1994 | Benenati | |
| 5,518,389 A * | 5/1996 | Nonomura et al. | 425/572 |
| 6,554,604 B1 | 4/2003 | Schmidt | |
| 6,729,871 B2 | 5/2004 | Sattler et al. | |
| 6,824,379 B2 | 11/2004 | Doyle et al. | |
| 2002/0121713 A1 | 9/2002 | Moss et al. | |
| 2004/0047935 A1 | 3/2004 | Moss et al. | |

FOREIGN PATENT DOCUMENTS

| | | |
|---|---|---|
| EP | 0 480 213 B1 | 4/1992 |
| WO | WO-01/47684 A1 | 7/2001 |
| WO | WO-2004/069517 A1 | 8/2004 |

OTHER PUBLICATIONS

"ezMODU System", YUDO web-site, www.yudo.com, (Feb. 3, 2005).
"Hot Runner System Options", *INCOE Corporation Brochure*, (Apr. 2004).
"Total Solution for Hot Runner", *YUDO Brochure*, unknown.

* cited by examiner

*Primary Examiner*—Tim Heitbrink
(74) *Attorney, Agent, or Firm*—Medler Ferro PLLC

(57) ABSTRACT

An injection molding apparatus includes a manifold having a manifold channel for receiving a melt stream of moldable material from a source and delivering the melt stream to a nozzle channel of a nozzle. A mold cavity communicates with the nozzle channel to receive the melt stream through the mold gate. A distribution assembly is located adjacent to the manifold. The distribution assembly includes at least one distribution member having a groove formed in an outer surface thereof and at least one conduit provided in the distribution member. The groove receives wiring from a heater of the nozzle and routes the wiring to a termination location or box. The conduit distributed fluid to various locations in the injection molding apparatus, such as actuation fluid for an actuator.

32 Claims, 12 Drawing Sheets

DISTRIBUTION ASSEMBLY FOR AN INJECTION MOLDING APPARATUS

FIELD OF THE INVENTION

The present invention relates generally to an injection molding apparatus and, in particular to a distribution assembly for a hot runner.

BACKGROUND OF THE INVENTION

A typical multi-cavity hot runner injection molding apparatus includes a heated manifold for delivering a pressurized melt stream to a plurality of heated nozzles. Each heated nozzle delivers melt to a respective mold cavity through a mold gate. Cooling channels are provided adjacent to the mold cavities to cool the molded parts prior to ejection from the injection molding apparatus.

The manifold and nozzles are typically heated by heaters that are linked to a power source through electrical wiring. In many cases, each nozzle includes both a heater wire and a thermocouple wire. As such, the routing of wiring throughout the hot runner may be difficult, particularly in systems with a large number of nozzles and, consequently, a large volume of wires. One technique for routing wiring includes machining wire-receiving grooves into mold plates surrounding the hot runner in order to direct the wires through the hot runner mold to the outside in order to connect to a remote power source. This solution is time consuming because the layout of the wire-receiving grooves often needs to be custom-designed for each injection molding application.

The routing of hydraulic fluid and/or compressed air conduits to actuators within a valve-gated injection molding apparatus also presents a challenge. Conventionally, conduits are either machined in the mold or via external tubing, and are coupled to a hydraulic fluid and/or compressed air source to control the valve pin actuators.

Routing of wiring and hydraulic fluid/compressed air conduits is a time consuming labor intensive process and the volume of the lines in the mold can become quite large and awkward to handle.

Hot runner molds with large volumes of wires and fluid lines can be difficult to disassemble should maintenance on the hot runner be required.

There is therefore a need to simplify the routing process.

SUMMARY OF THE INVENTION

The present invention is directed towards an injection molding hot runner apparatus having at least one nozzle with a heater and including a preformed distribution member which has a groove for receiving the wiring from the nozzle heater and routing/guiding it through the hot runner mold.

In another aspect of this invention the preformed distribution member may also provide conduits for providing and routing fluids within the hot runner apparatus, for example, to operate hydraulic or pneumatic actuators for valve-gated nozzles.

In yet another aspect of this invention two or more preformed distribution members may be connected to form a distribution assembly to achieve a desired configuration to provide and route some or all electrical and fluid services to the hot runner apparatus.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
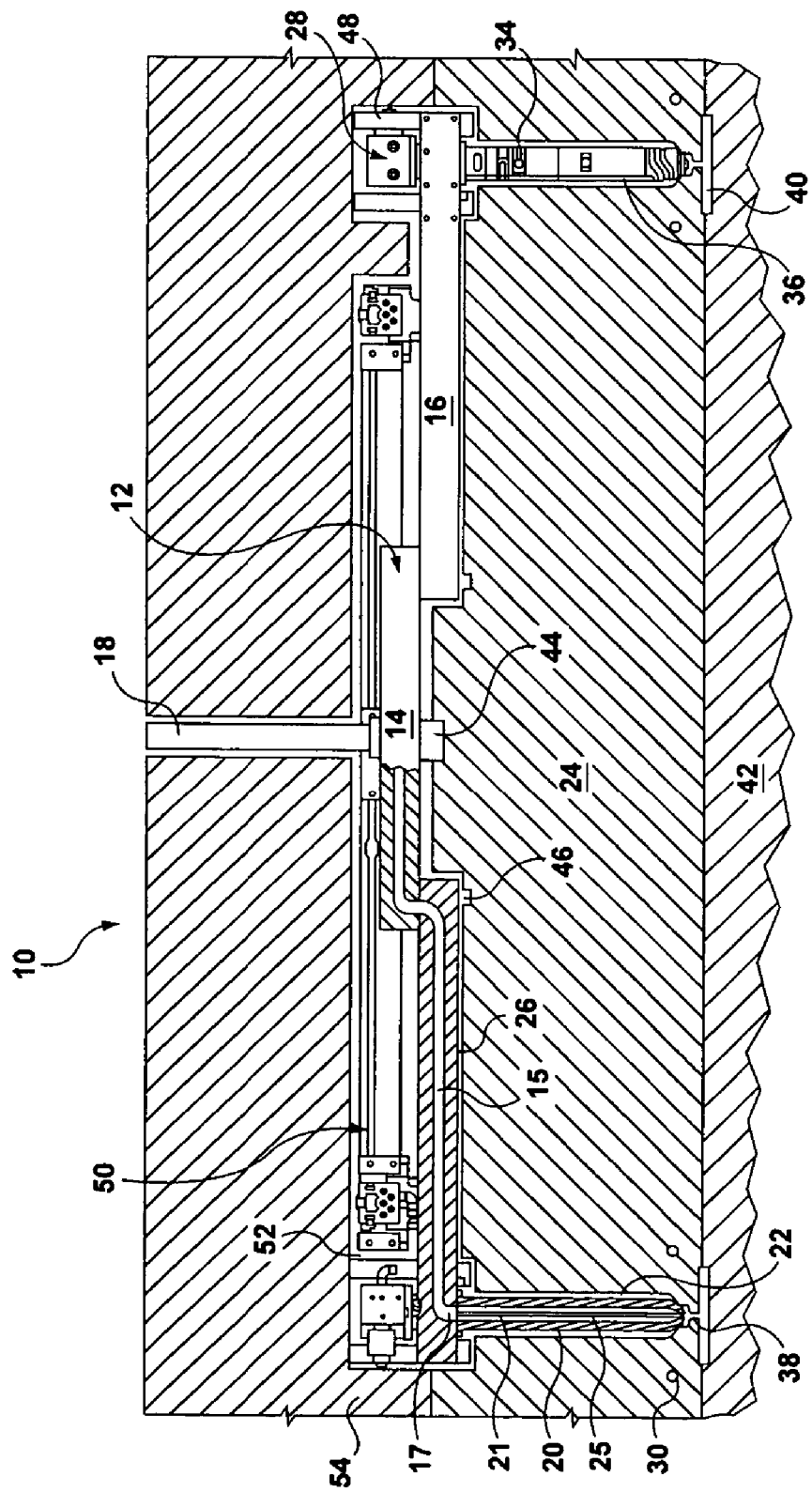
FIG. 1 is a side view partly in section of an injection molding apparatus according to an embodiment of the present invention.
Figure 2:
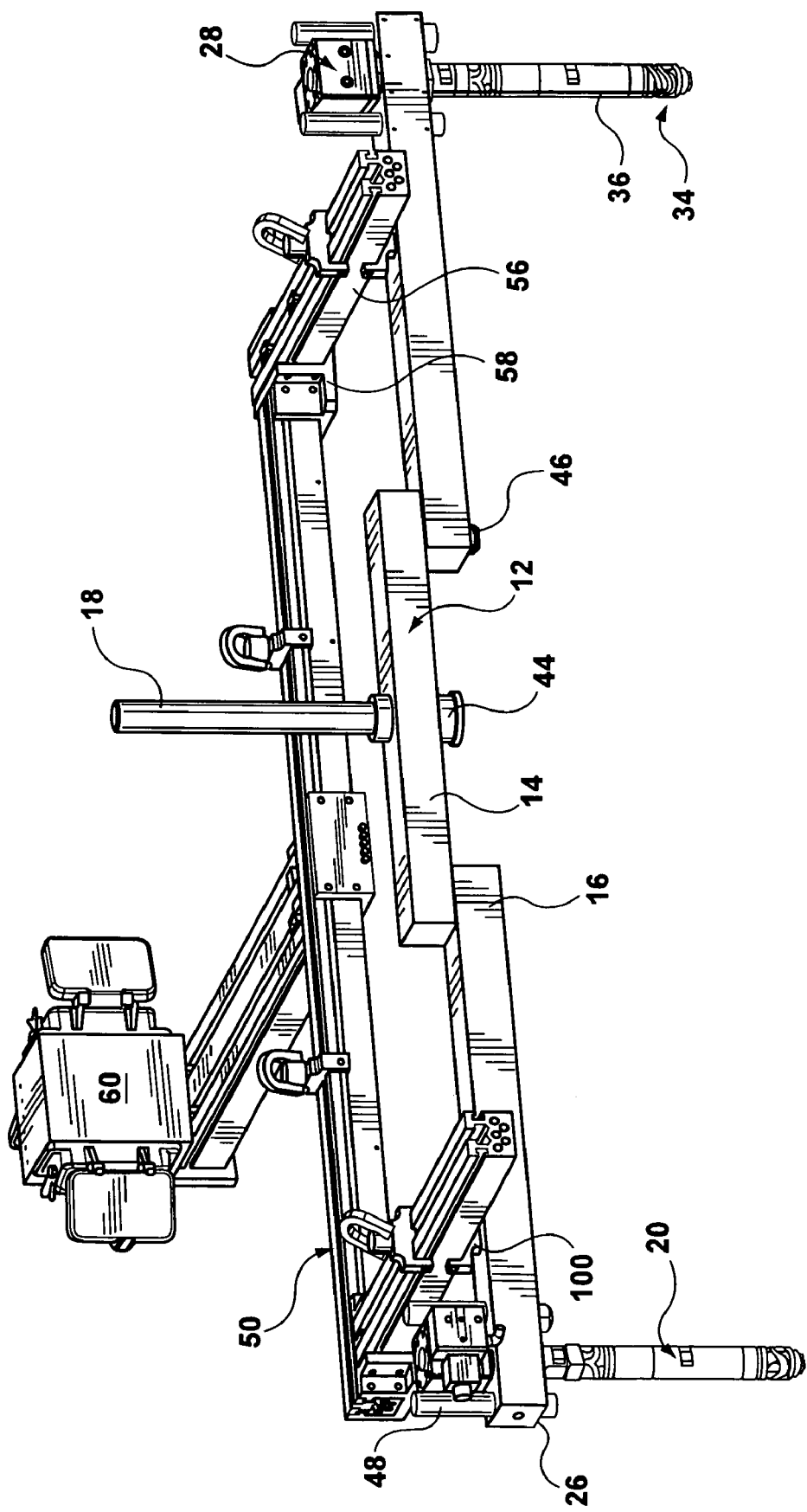
FIG. 2 is an isometric view of a portion of the injection molding apparatus of FIG. 1.

Referring now to FIGS. 1 and 2, an injection molding apparatus 10 is generally shown. Injection molding apparatus 10 includes a manifold 12, which is made up of a main manifold 14 and a pair of sub-manifolds 16. A manifold melt channel 15 extends through the manifold 12 from an inlet (not shown), which is provided in main manifold 14, to outlets 17, which are provided in sub-manifolds 16. The manifold melt channel 15 receives a melt stream of moldable material from a machine nozzle (not shown) through a sprue bushing 18 and delivers the melt to nozzle channels 21 of hot runner nozzles 20. The manifold 12 is heated by a manifold heater (not shown).

Although a pair of hot runner nozzles 20 is shown in FIGS. 1 and 2, it will be appreciated by a person skilled in the art that a typical injection molding apparatus may include only one or a plurality of hot runner nozzles for receiving melt from respective manifold outlets. Similarly, although a manifold including a main manifold and a pair of sub-manifolds is shown, the manifold may be a single manifold or may include a main manifold and a plurality of sub-manifolds.

Each nozzle 20 is received in an opening 22 in a mold plate 24. The nozzles 20 are front mounted nozzles, which are coupled to outlet surfaces 26 of the sub-manifolds 16. Front mounted nozzles are well known in the art and therefore will not be described further here. The nozzles 20 are heated by heaters 34 and further include thermocouples 36.

Valve pins 25 extend through the nozzle channels 21 and are axially movable by actuators 28 to selectively engage respective mold gates 38. Each actuator 28 generally includes a piston and cylinder arrangement in which the piston is movable under the application of pressure by a hydraulic fluid or compressed air. Alternatively, the actuator 28 may be electrically operated.

A mold cavity 40 is provided between mold plate 24 and a second mold plate 42. Mold cavity 40 receives melt from the nozzle channel 21 through the mold gate 38. Cooling channels 30 extend through mold plate 24 to cool mold cavity 40.

A locating ring 44 is provided to locate the main manifold 14 relative to the mold plate 24. Additional locators 46 extend from outlet surfaces 26 of the sub-manifolds 16 to locate the manifold 12 relative to the mold plate 24. Pillars 48 extend from sub-manifolds 16 to space sub-manifolds 16 from a third mold plate 54.

In operation, melt is injected from the machine nozzle into manifold melt channel 15 of manifold 12 through sprue bushing 18. Nozzle melt channels 21 of nozzles 20 receive melt from manifold outlets 17. Valve pins 25 are retracted to allow melt to flow from nozzle channels 21 into mold cavities 40 through mold gates 38. Once the mold cavities 40 have been filled with melt, the valve pins 25 are extended to stop the flow of melt through mold gates 38, the melt in the mold cavities 40 is cooled and the molded parts are ejected from the mold cavities 40.

A distribution assembly 50 is located between the back plate and the sub-manifold 16 and is received in an opening 52 in the third mold plate 54. The distribution assembly 50 is generally in the same plane as the actuators 28 of valve pins 25. The distribution assembly 50 generally routes cables (not shown), wiring (not shown) and fluids between the nozzles 20 and a termination location or box 60.

Figure 3:
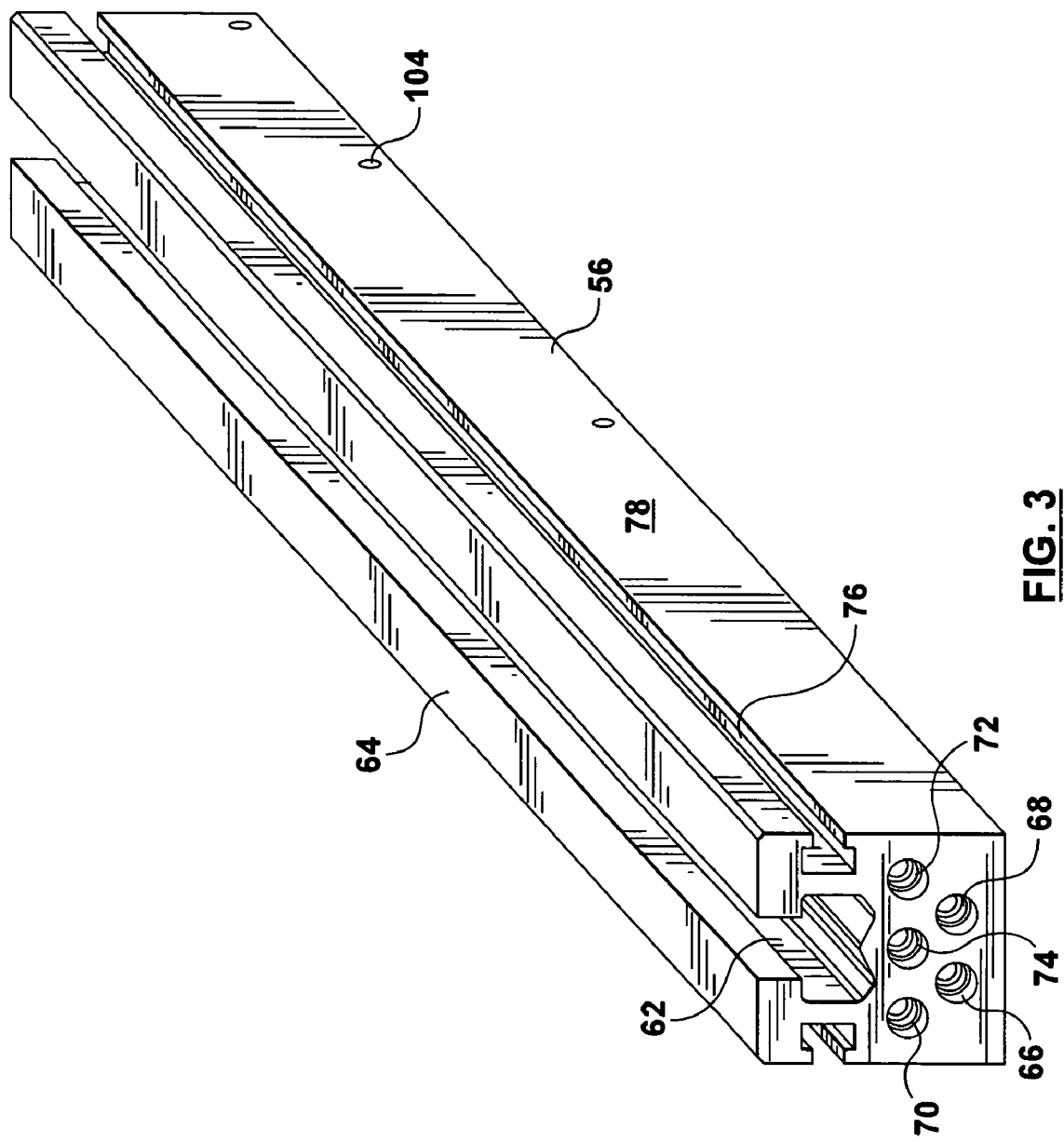
FIG. 3 is an isometric view of a distribution member of the injection molding apparatus of FIG. 1.

The distribution assembly 50 includes distribution members 56 that are coupled to one another through connecting brackets 58. Referring to FIG. 3, each distribution member 56 includes a groove 62 provided in an upper surface 64 thereof. The groove 62 is sized to receive a plurality of cables and wires including electrical wiring from nozzle heaters, wiring from thermocouples, control wires used for actuation of valve pins 25 and wiring for various other mold sensors. Some examples of other sensors used in injection molding apparatus 10 include: sensors for determining piston location, pressure sensors and fluid flow sensors. The groove 62 further provides protection to the cables and wiring between the nozzles 20 and the termination box 60 from damage that may occur during assembly and disassembly of the injection molding apparatus 10.

Cooling inlet conduits 66 and cooling return conduits 68 extend through the distribution members 56. A cooling fluid circulates through the cooling conduits 66, 68 in order to cool the actuators 28, which may overheat during operation of the injection molding apparatus 10. The cooling fluid may be any suitable coolant, such as water, for example.

Actuator fluid inlet conduits 70, 72 and actuator fluid return conduit 74 extend through the distribution members 56 to operate the actuators 28. In the case in which the actuator 28 is hydraulic, the actuator fluid is a hydraulic fluid such as oil, for example. Alternatively, in the case in which the actuator 28 is pneumatic, the actuator fluid is a compressed gas, such as air, for example. By providing two actuator inlet conduits 70, 72, it is possible to operate a first set of actuators in a different sequence than a second set of actuators. In addition, valves may be mounted on or near the cylinders of the actuators 28 and controlled electrically while drawing pressure from the fluid inlet conduits 70, 72.

Each distribution member 56 further includes a pair of T-slots 76 that are provided in opposing side surfaces 78 thereof. Mounting apertures 104, which allow for mating with connecting brackets 58 or other components, are generally regularly spaced along the side surfaces 78 of each distribution member 56.

The distribution members 56 are formed from aluminum extrusions. A single extrusion may be divided into several individual distribution members 56. The distribution members 56 are not limited to being made from aluminum. Another suitable material may alternatively be used. Further, the distribution member 56 may alternatively be machined or formed by any other known method. The complexity of the profile required to accommodate the particular application may dictate how best the distribution member 56 should be made.

Figure 4:
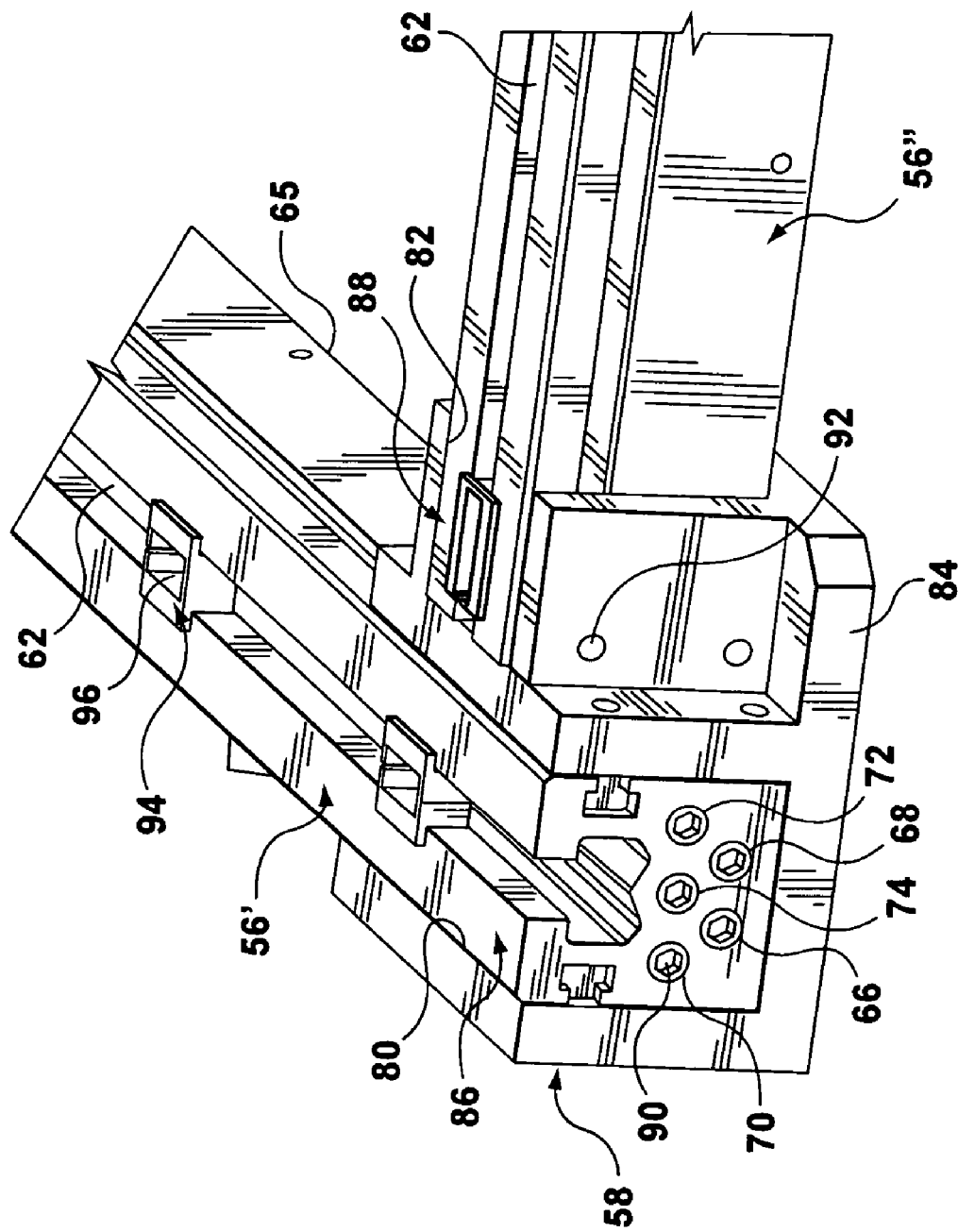
FIG. 4 is an isometric view of a portion of the injection molding apparatus of FIG. 1.

Referring to FIG. 4, the connecting bracket 58 provides a transition between a first distribution member 56' and a second distribution member 56". The connecting bracket 58 includes a first slot 80, a second slot 82 and a base 84. The first slot 80 receives an end 86 of first distribution member 56' and the second slot 82 receives an end 88 of second distribution member 56". As shown, outlets of the conduits 66, 68, 70, 72, 74 of first distribution member 56" are blocked with plugs 90 and apertures (not shown) are machined into a lower surface 65 thereof, which is in abutment with the base 84. The second distribution member 56" is modified in a similar manner. The base 84 of the connecting bracket 58 includes five branching conduits (not shown) that are aligned with the apertures of the first and second distribution branches 56', 56". The branching conduits allow for uninterrupted communication between the conduits 66, 68, 70, 72, 74 of the first and second distribution members 56' and 56" through the connecting bracket 58.

The connecting brackets 58 are coupled to the distribution members 56', 56" by fasteners (not shown), which extend through apertures 92. The connecting brackets 58 are machined from aluminum; however, any other suitable material or production method may alternatively be used.

Because the connecting bracket 58 of FIG. 4 functions to join first and second distribution members 56', 56" at generally a 90-degree angle, the bracket 58 is generally T-shaped, as shown. Other connecting brackets 58 may be provided to join distribution members 56 to one another at a different angle or in an end-to-end arrangement. It will be appreciated by a person skilled in the art that such connecting brackets 58 will have a slightly different configuration, but will function in a similar manner.

In order for the cables and wires (not shown) to pass from one distribution member 56 to another, grommets 94 are provided in the grooves 62. Each grommet 94 includes a passage 96 for wires to pass through. The grommets 94 are provided so that the wires enter and exit the grooves 62 in a neat and controlled manner.

Figure 5:
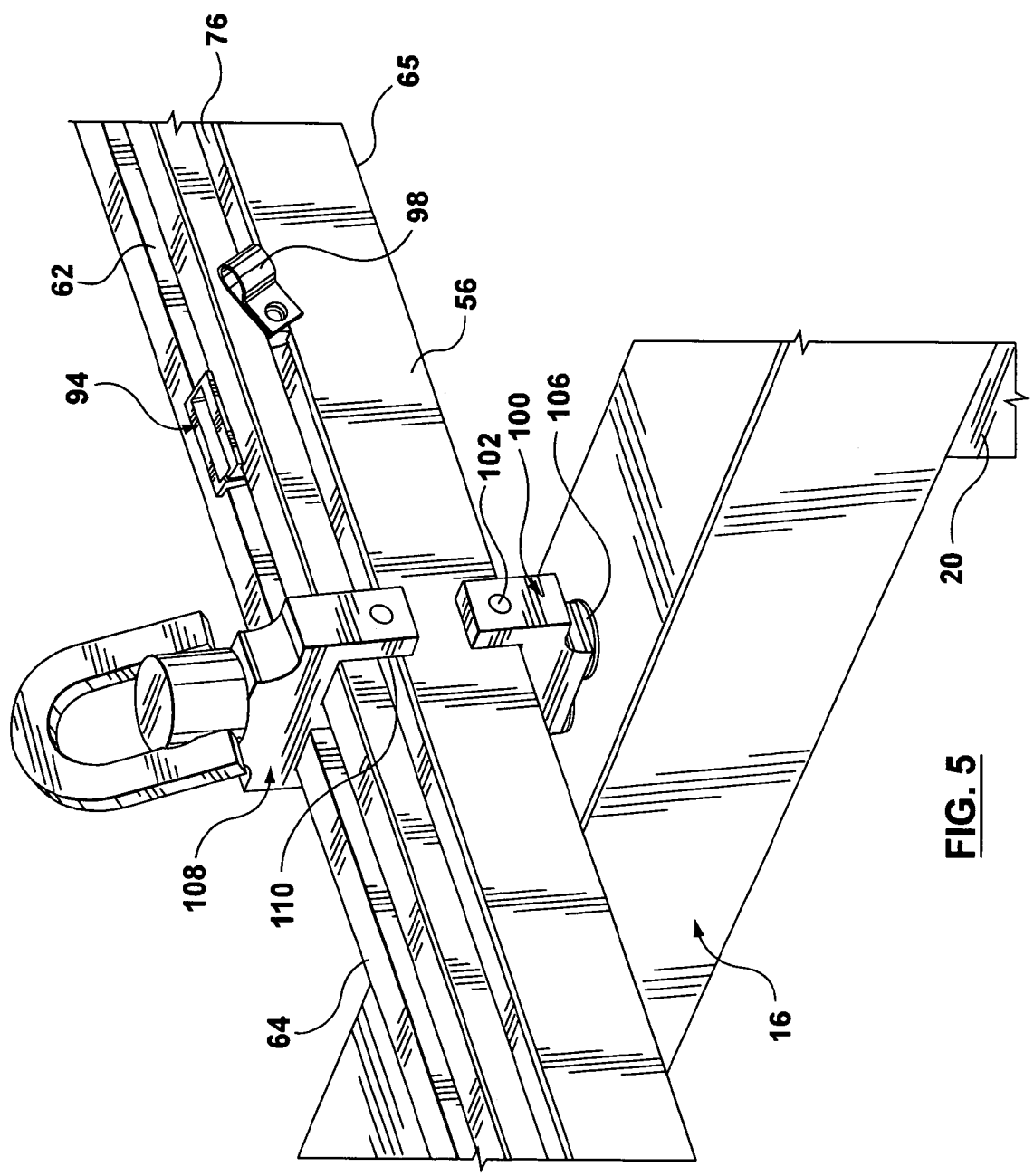
FIG. 5 is an isometric view of another portion of the injection molding apparatus of FIG. 1.

Referring to FIG. 5, cables and wires also enter or exit the groove 62 adjacent the nozzles 20. Loop straps 98, which are mounted in the T-slots 76 of the distribution members 56, guide the wiring between the nozzle 20 and the groove 62. The loop straps 98 may also be provided at other locations on the injection molding apparatus 10 where wiring extends outside of the groove 62. The loop straps 98 may alternatively be mounted to the manifold 12.

Referring back to FIG. 2, the distribution assembly 50 is coupled to the manifold 12 by mounting brackets 100. As shown in FIG. 5, each mounting bracket 100 is generally U-shaped and is located between the sub-manifold 16 and the lower surface 65 of the distribution member 56. The mounting bracket 100 is coupled to the distribution member 56 by fasteners (not shown) that extend through apertures 102 of the mounting bracket 100 and apertures 104 of the distribution member 56. Fasteners (not shown) also couple the mounting bracket 100 to the sub-manifold 16. The fasteners extend through washers 106, which are made of an insulating material such as titanium, for example, to minimize heat loss from the sub-manifold 16 to the distribution assembly 50.

Hoist rings 108 are coupled to the top surface 64 of the distribution member 56 at the mounting bracket 100 locations. The hoist rings 108 are coupled to the distribution member 56 by fasteners 110 that mate with the T-slot 76. The hoist rings 108 are provided for assembly purposes only and are removed following installation of the distribution assembly 50.

Figure 6:
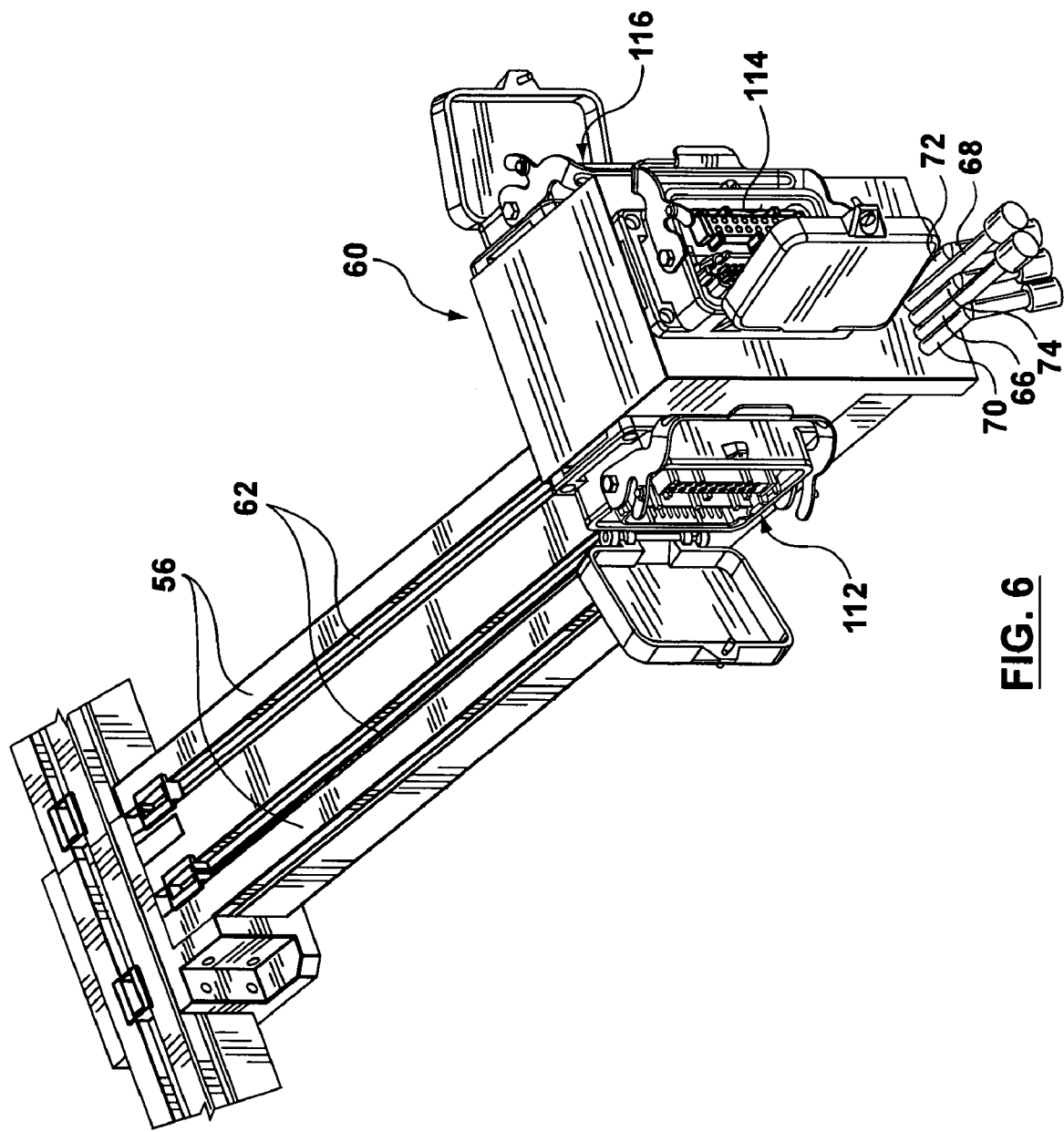
FIG. 6 is an isometric view of yet another portion of the injection molding apparatus of FIG. 1.

Referring to FIG. 6, all of the wiring that is received in the grooves 62 of the distribution assembly 50 is directed to the termination box 60 through a pair of distribution members 56. The distribution members 56 are provided in a side-by-side arrangement and therefore include a pair of grooves 62 for accommodating the large volume of wires. Additional distribution members 56 may also be added if the injection molding system is particularly large and/or complex.

The termination box 60 includes a first connector 112 that is coupled to a power source (not shown) for providing power to the nozzle heaters 34 and manifold heaters of the injection molding apparatus 10. A second connector 114 links the thermocouple terminations to a circuit (not shown) that uses the thermocouple output to control the power input to the heaters associated with the respective thermocouples. A third connector 116 is coupled to a control circuit (not shown) for controlling the actuators. The termination box 60 further includes a single termination point for each of the conduits 66, 68, 70, 72, 74. Each of the conduits 66, 68, 70, 72, 74 is linked to a fluid supply or return at this location.

It will be appreciated by a person skilled in the art that separate connectors 112, 114, 116 are provided for volume purposes. In a relatively small, simple apparatus, a single connector may be provided for power, thermocouples, and control wiring.

Figure 7:
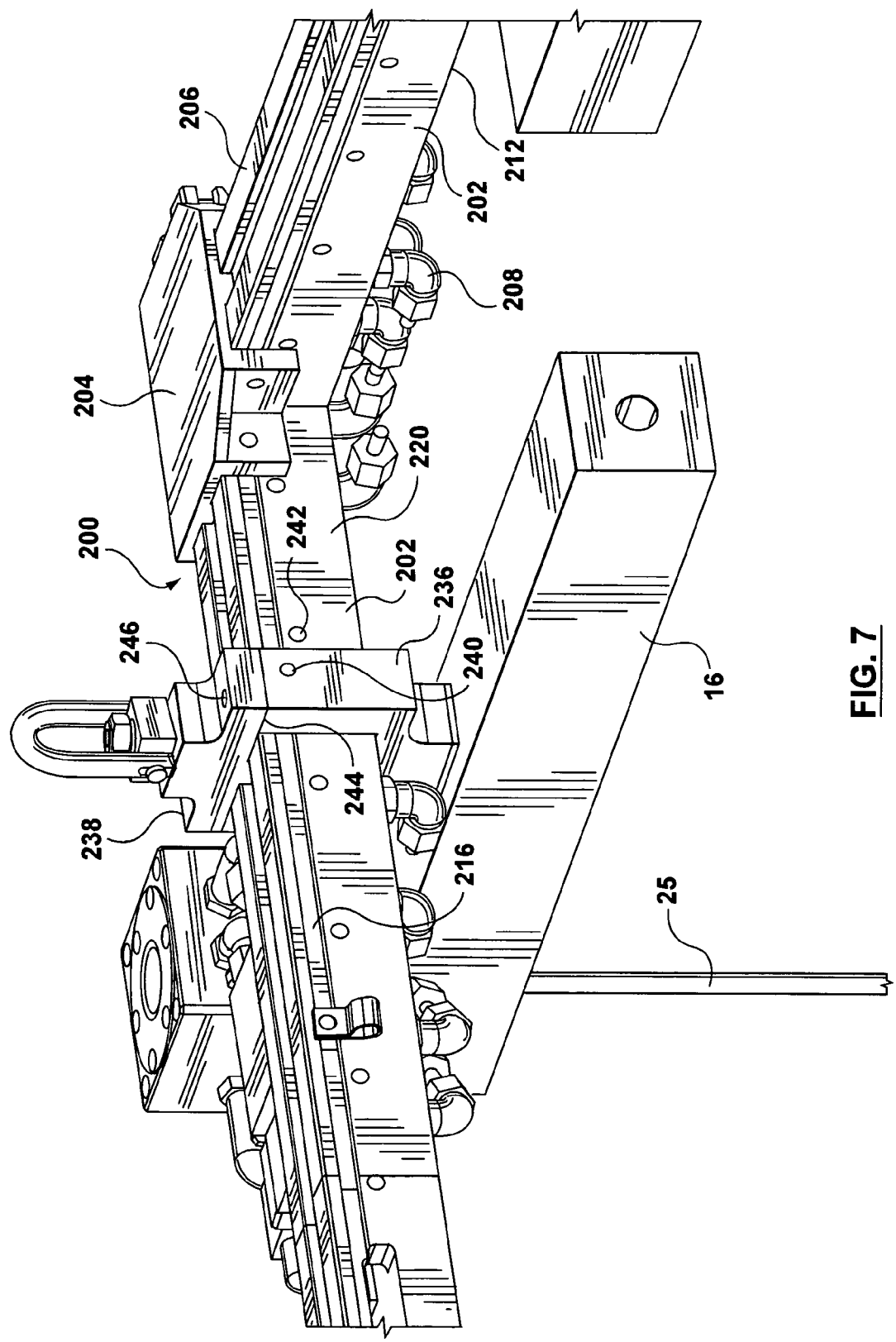
FIG. 7 is an isometric view of a portion of an injection molding apparatus with a second embodiment of a distribution assembly.

FIGS. 7-12 show another embodiment of a distribution assembly 200 for use with an injection molding apparatus such as the one shown in FIG. 1. FIG. 7 shows distribution assembly 200, including distribution members 202 and connecting bracket 204, in relation to sub-manifold 16 and valve pin 25.

Figure 8:
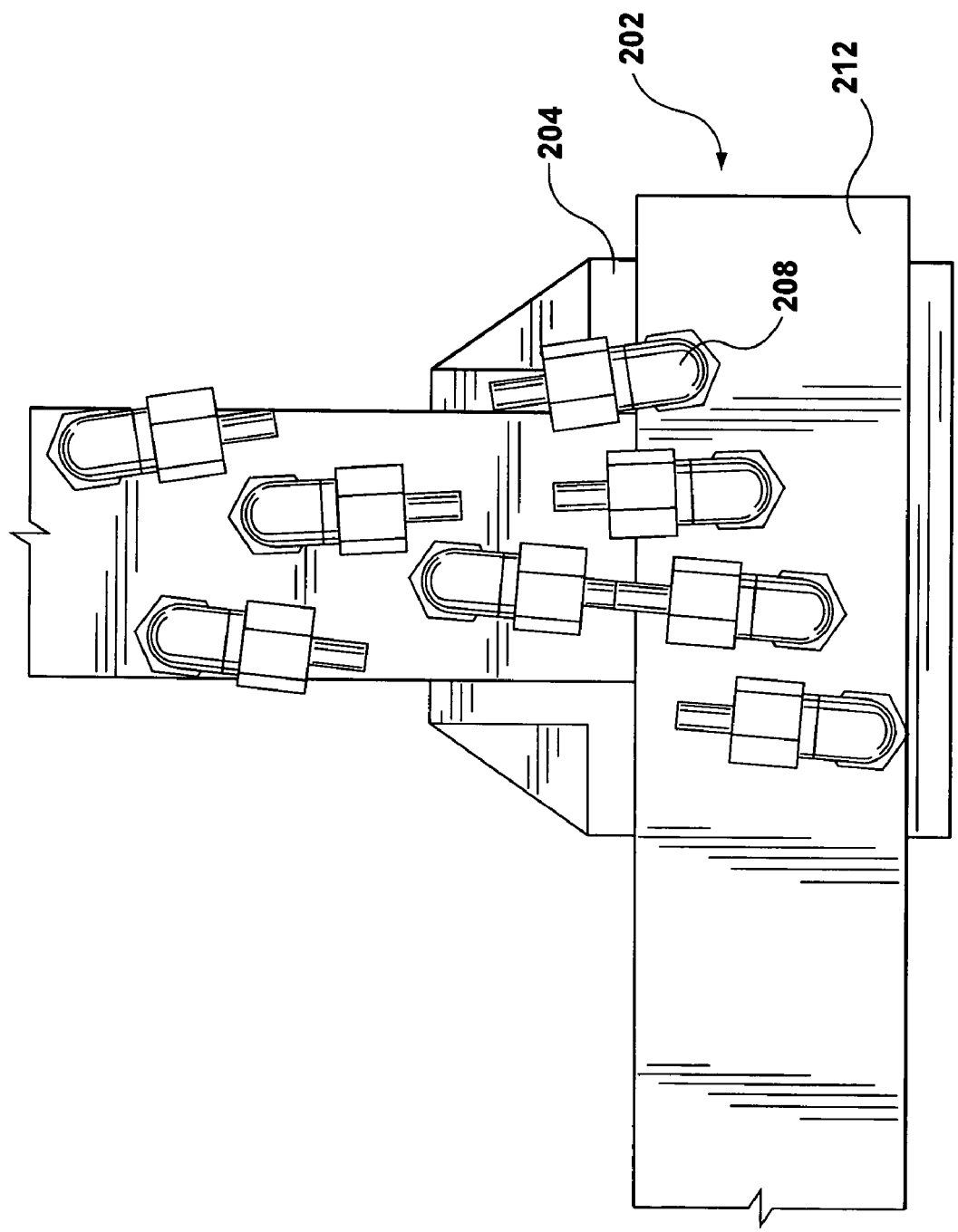
FIG. 8 is a bottom view of a portion of the distribution assembly of FIG. 7.
Figure 9:
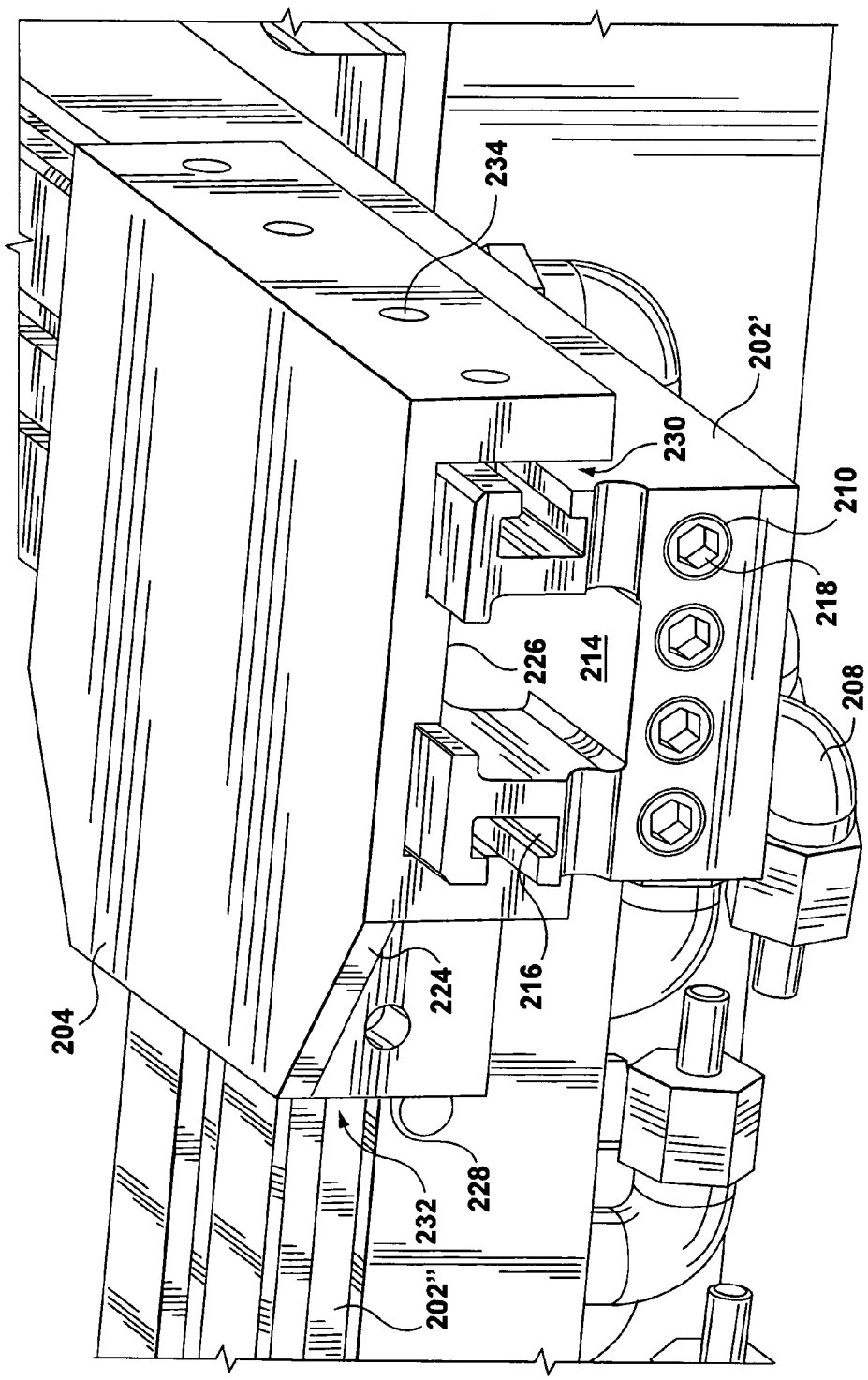
FIG. 9 is an isometric view of a portion of the distribution assembly of FIG. 7.
Figure 10:
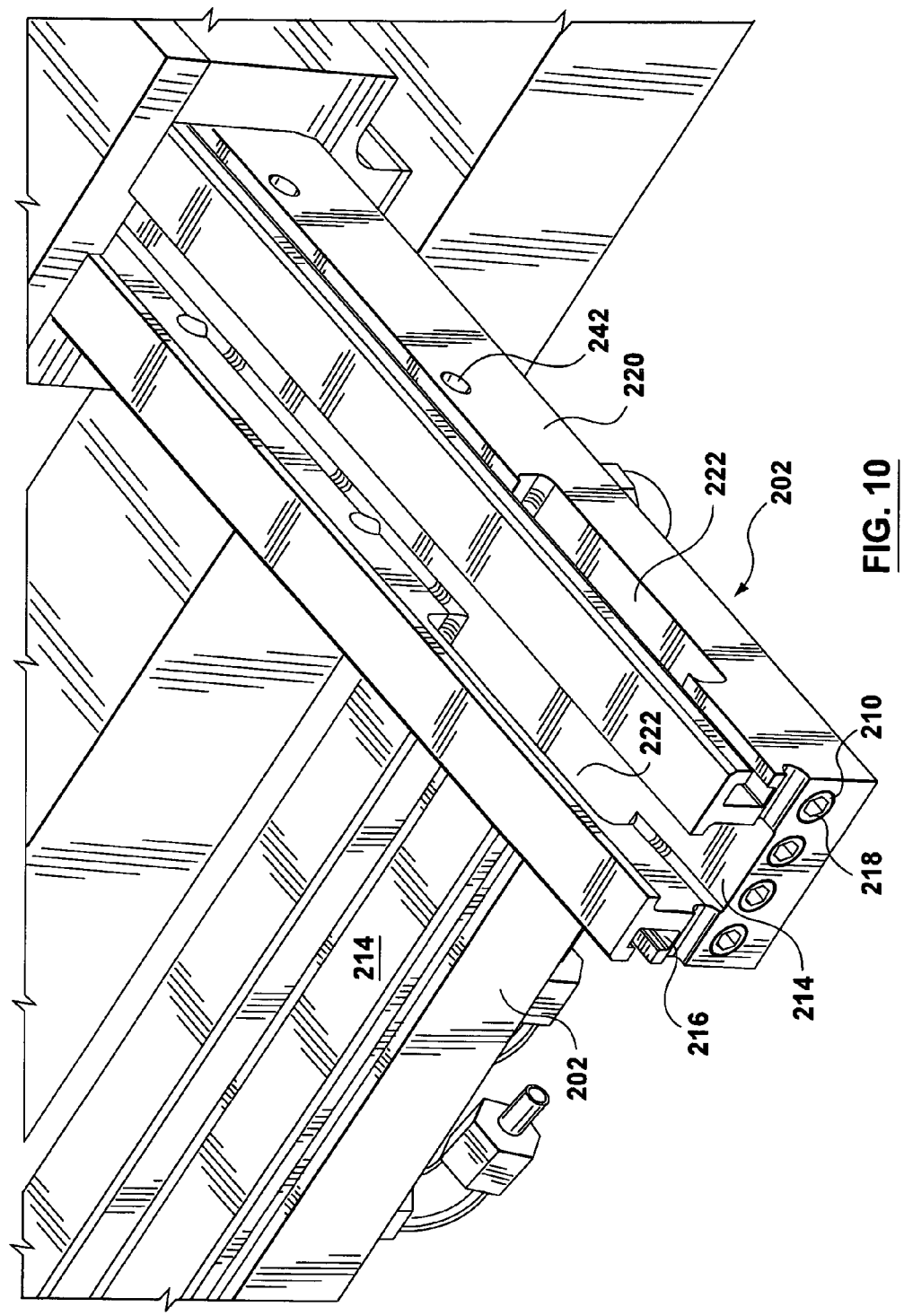
FIG. 10 is an isometric view of a portion of the distribution assembly of FIG. 7.
Figure 11:
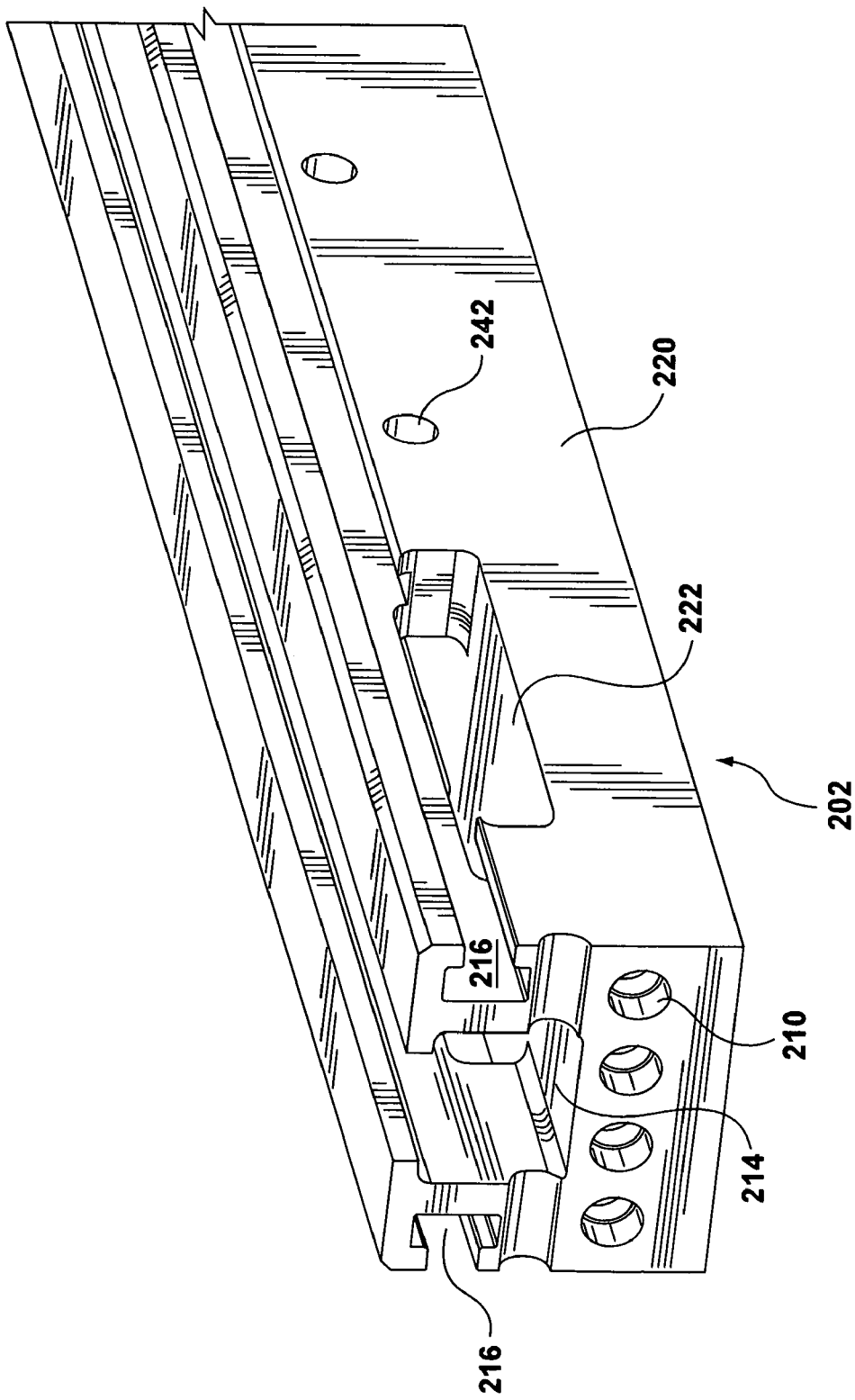
FIG. 11 is an isometric view of a portion of distribution member of the distribution assembly of FIG. 7.

As can be seen in FIGS. 7 and 8, connecting bracket 204 is disposed on the top surface 206 of distribution members 202, rather than the bottom surface as shown in FIG. 4, for example. Further, fittings 208 are connected to conduits 210 in distribution members 202 and extend from a bottom surface 212 of the distribution members 202. FIGS. 7-12 show four (4) conduits 210, as shown in FIGS. 9-11. However, as would be understood by those skilled in the art, any number of conduits 210 can be used as necessary for the distribution assembly 200. For example, five (5) conduits 210, corresponding to the conduits 66, 68, 70, 72 and 74 shown in a first embodiment, may be used. A corresponding fitting 208 for each conduit 210 would therefore be appropriate. Utilizing fittings 208 for conduits 210 permits an easier connection between adjacent distribution members 202, and does not require the branching conduits described with respect to base 84 of the connecting bracket 58 of the first embodiment. The ends of corresponding fittings 208 of distribution members 202 may connect with tubing, hoses, or the like. Fittings 208 may be hydraulic fittings, such as SEAL-LOK O-ring face seal fittings available from Parker Hannifin, or other fittings or the like, as would be understood by those skilled in the art.

As shown in FIGS. 7 and 10-12, distribution members 202 include apertures 242 spaced along side surfaces 220 thereof. Apertures 242 allow wiring from distribution members 202 to exit the distribution member in order to connect with devices of the injection molding apparatus.

Referring to FIGS. 10 and 11, distribution member 202 includes a groove 214 and T-slots 216, similar to the first embodiment. Further, in order to simplify the routing of wires between grooves 214 of distribution members 202, slots 222 are provided in side surfaces 220 of distribution members 202. As can be seen, one of the slots 222 is aligned with a groove 214 of a corresponding distribution member 202 when the distribution members are connected by a connecting bracket (not shown in FIG. 10 for convenience).

Referring to FIG. 9, connecting bracket 204 provides a transition between a first distribution member 202' and a second distribution member 202". The connecting bracket 204 includes a top 224, a first slot 226, and a second slot 228. The first slot 226 receives an end 230 of first distribution member 202' and the second slot 228 receives an end 232 of second distribution member 202". As shown, outlets of the conduits 210 of first distribution member 202' are blocked with plugs 218.

The connecting brackets 204 are coupled to the distribution members 202 by fasteners (not shown), which extend through apertures 234 and engage T-nuts (not shown) disposed in T-slots 216. As discussed with respect to the first embodiment, connecting brackets 204 are machined from aluminum, however, any other suitable material or production method may alternatively be used.

Because the connecting bracket 204 of FIG. 9 functions to join first and second distribution members 202', 202" at generally a 90-degree angle, the bracket 204 is generally T-shaped, as shown. Other connecting brackets may be provided to join distribution members 202 to one another at a different angle or in an end-to-end arrangement. It will be appreciated by a person skilled in the art that such connecting brackets 204 will have a slightly different configuration, however, will function in a similar manner.

Referring back to FIG. 7, the distribution assembly 200 is coupled to sub-manifold 16 using a different embodiment of a mounting bracket 236. Similar to the embodiment shown in FIG. 5, mounting bracket 236 is generally U-shaped and is located between the sub-manifold 16 and the lower surface 212 of the distribution member 202. Mounting bracket 236 is coupled to distribution member 202 by fasteners (not shown) that extend through apertures 240 of mounting bracket 236 and are coupled to T-nuts (not shown) in T-slots 216 of distribution member 202. Fasteners (not shown) also couple the mounting bracket 236 to the sub-manifold 16. The fasteners extend through washers (not shown), as described with respect to FIG. 5.

A hoist ring 238 is coupled to a top surface 244 of mounting bracket 236. Hoist ring 108 is coupled to mounting bracket 236 by fasteners (not shown) extending through aperture 246 in hoist ring 238 that mate with an aperture (not shown) in top surface 244 of mounting bracket 236. As described with respect to the first embodiment, mounting brackets 236 are located at various locations in distribution assembly 200, and hoist rings 238 are provided at these same locations. Hoist rings 238 are for assembly purposes only and are removed following installation of the distribution assembly 200.

Figure 12:
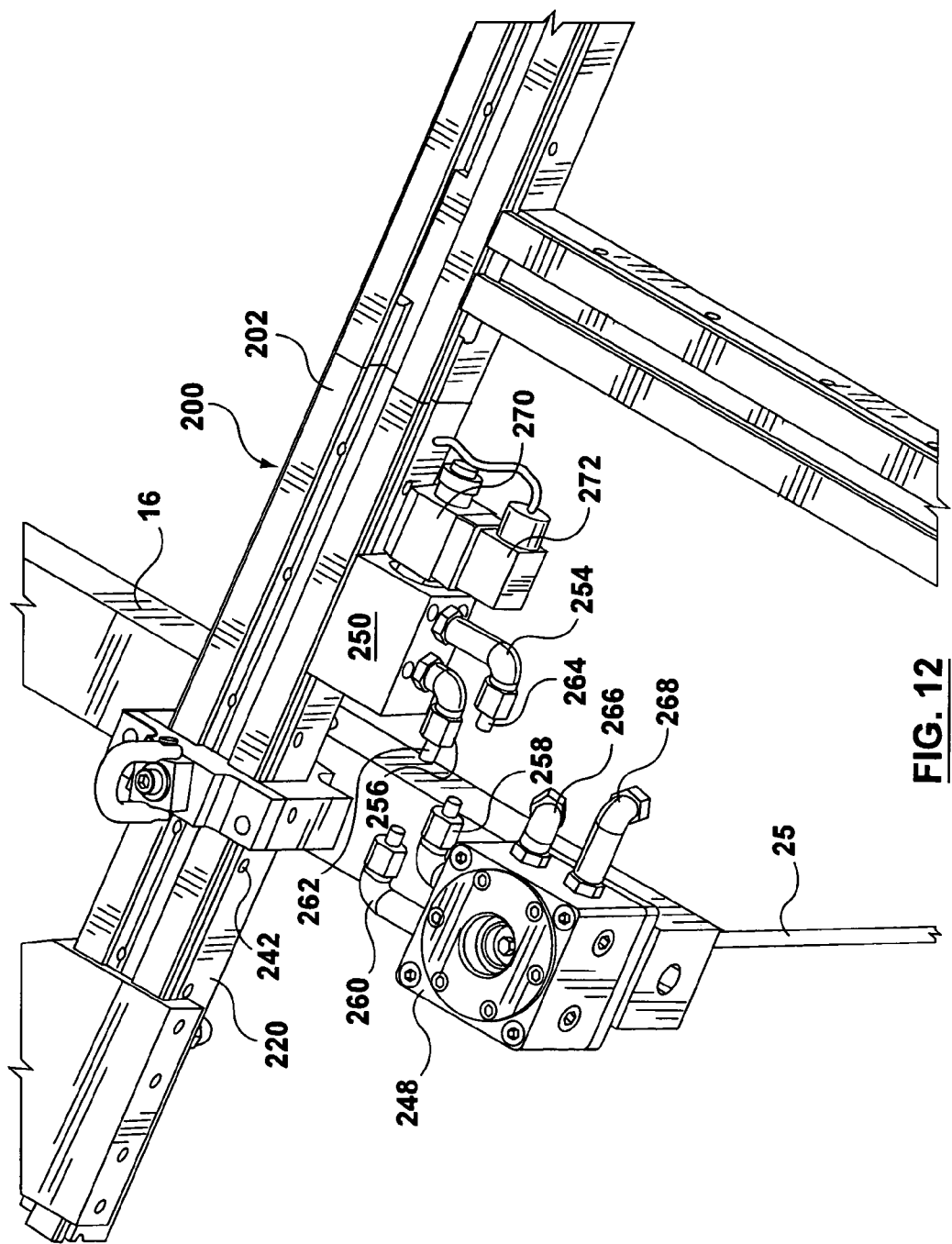
FIG. 12 is an isometric view of a portion of an injection molding apparatus.

Referring to FIG. 12, a perspective view of distribution assembly 200 with respect to a sub-manifold 16 is shown. Valve pin 25 disposed at least partially within a nozzle is moved by an actuator 248. In the embodiment shown in FIG. 12, each actuator 248 of an injection molding apparatus (only one is shown for convenience) may be individually controlled using a control valve 250, such as a four-port, two-way control valve. Control valve 250 includes fittings 254, 256, which connect with fittings 258, 260 of actuator 248 using tubing 262, 264, for example. The fittings and tubing result in two connections between control valve 250 and actuator 248, one of which is a pressure line and the other of which is a return line.

Actuator 248 may also include fittings 266, 268 for cooling liquid. The fittings 266, 268 are coupled to cooling conduits in distribution member 202 to prevent overheating of the actuator 248, which is adjacent to heated sub-manifold 16.

As shown in FIG. 12, control valve 250 is mounted to distribution member 202. Adjacent control valve 250 is a solenoid 270 and a wiring box 272. Wiring box 272 received wires from distribution member 202 to operate solenoid 270 and control valve 250. Wires from distribution member 202 may exit distribution member 202 through one of apertures 242 in a side surface 220 of distribution member 202, for example.

The many features and advantages of the invention are apparent from the detailed specification and, thus, it is intended by the appended claims to cover all such features and advantages of the invention that fall within the true spirit and scope of the invention. Further, multiple embodiments have been described and different features of those embodiment may be interchanged. For example, the hoist ring and mounting bracket of the second embodiment may be used in conjunction with the first embodiment, and vice versa. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    a manifold having a manifold channel, said manifold channel receiving a melt stream of moldable material from a source;
    a nozzle coupled to said manifold, said nozzle having a nozzle channel for receiving said melt stream from said manifold channel;
    a heater and temperature sensor coupled to said nozzle;
    a valve pin slidable through said nozzle channel of said nozzle, said valve pin being movable by an actuator; and
    a distribution assembly located adjacent to said manifold, said distribution assembly having at least one distribution member, said at least one distribution member including,
        a groove provided in an outer surface of said at least one distribution member, said groove for receiving wiring from said heater and temperature sensor and routing said wiring to a termination location on said injection molding apparatus, and
        a first conduit and a second conduit extending through said distribution member, said first conduit for transporting a fluid from a source through said distribution assembly, said second conduit for returning the fluid to the source.

2. The injection molding apparatus as claimed in claim 1, wherein said fluid is actuation fluid for an actuator.

3. The injection molding apparatus as claimed in claim 2, wherein said actuator is driven hydraulically and said actuation fluid is hydraulic fluid.

4. The injection molding apparatus as claimed in claim 2, wherein said actuator is driven pneumatically and said actuation fluid is compressed air.

5. The injection molding apparatus as claimed in claim 1, wherein said fluid is a coolant.

6. The injection molding apparatus as claimed in claim 5, wherein said coolant is water.

7. The injection molding apparatus as claimed in claim 1, further comprising:
    a third conduit and a fourth conduit extending through said distribution member, said third conduit for transporting a second fluid from a source through said distribution assembly to an actuator, said fourth conduit for returning the second fluid from said actuator to the source.

8. The injection molding apparatus as claimed in claim 7, wherein said fluid is a coolant and said second fluid is actuation fluid for said actuator.

9. The injection molding apparatus as claimed in claim 8, wherein said actuation fluid is a hydraulic fluid.

10. The injection molding apparatus as claimed in claim 8, wherein said actuation fluid is air.

11. The injection molding apparatus as claimed in claim 8, wherein said coolant is water.

12. The injection molding apparatus as claimed in claim 1, wherein said distribution member is an aluminum extrusion.

13. An injection molding apparatus comprising:
    a manifold having a manifold channel, said manifold channel receiving a melt stream of moldable material from a source;
    a plurality of nozzles coupled to said manifold, each of said nozzles having a nozzle channel for receiving said melt stream from said manifold channel;
    a heater and temperature sensor coupled to each of said nozzles;
    a valve pin slidable through each of said nozzle channels of said nozzles, each of said valve pins being movable by an actuator; and
    a distribution assembly located adjacent to said manifold, said distribution assembly having a plurality of distribution members, each of said distribution members including,
        a groove provided in an outer surface of said distribution member, said groove for receiving wiring from said heaters and temperature sensors and routing said wiring to a termination location on said injection molding apparatus, and
        a first conduit and a second conduit extending through said distribution member, said first conduit for transporting a fluid from a source through said distribution assembly to said actuators, said second conduit for returning the fluid from said actuators to the source.

14. The injection molding apparatus as claimed in claim 13, further comprising a connecting bracket for connecting a first distribution member and a second distribution member of said plurality of distribution members together.

15. The injection molding apparatus as claimed in claim 14, wherein said connecting bracket comprises a first slot for receiving said first distribution member and a second slot for receiving said second distribution member.

16. The injection molding apparatus as claimed in claim 15, wherein said connecting bracket further comprises a base.

17. The injection molding apparatus as claimed in claim 14, wherein said first distribution member and said second distribution member include T-slots formed in side surfaces thereof, wherein said connecting bracket is coupled to said first and second distribution members through screws extending through apertures in said connecting bracket and mating with T-nuts disposed in said T-slots.

18. The injection molding apparatus as claimed in claim 14, wherein said connecting bracket is coupled to said first and second distribution members through screws extending through apertures in said connecting bracket and mating with apertures formed in side surfaces of said first and second distribution members.

19. The injection molding apparatus as claimed in claim 14, wherein said connecting bracket is machined from aluminum.

20. An injection molding apparatus comprising:
   a manifold having a manifold channel, said manifold channel receiving a melt stream of moldable material from a source;
   a nozzle coupled to said manifold, said nozzle having a nozzle channel for receiving said melt stream from said manifold channel;
   a valve pin slidable through said nozzle channel of said nozzle, said valve pin being movable by an actuator;
   a distribution assembly located adjacent to said manifold, said distribution assembly having at least one distribution member;
   a groove provided in an outer surface of said distribution member, said groove for receiving wiring and routing said wiring; and
   at least one conduit provided in said distribution member to transport a fluid.

21. An injection molding apparatus as claimed in claim 20, wherein said distribution member is an extrusion.

22. An injection molding apparatus as claimed in claim 21, wherein said extruded distribution member is made of aluminum.

23. The injection molding apparatus as claimed in claim 20, further comprising a mounting bracket for mounting said distribution member to said manifold.

24. The injection molding apparatus as claimed in claim 23, wherein said mounting bracket comprises a U-shaped member located between said manifold and a lower surface of said distribution member.

25. The injection molding apparatus as claimed in claim 24, wherein the mounting bracket is coupled to the distribution member by fasteners that extend through apertures in a side surface of said mounting bracket and apertures in a side surface of said distribution member.

26. The injection molding apparatus as claimed in claim 23, wherein said mounting bracket is coupled to said manifold using fasteners that extend through insulating washers.

27. The injection molding apparatus as claimed in claim 20, further comprising a hoist ring coupled to a top surface of said distribution member.

28. The injection molding apparatus as claimed in claim 27, wherein said hoist ring is coupled to said distribution member by fasteners that mate with T-slots formed in said distribution member.

29. The injection molding apparatus as claimed in claim 23, wherein said mounting bracket is coupled to said distribution member by fasteners that mate with T-slots formed in said distribution member.

30. The injection molding apparatus as claimed in claim 23, further comprising a hoist ring coupled to said mounting bracket.

31. The injection molding apparatus as claimed in claim 30, wherein said hoist ring is coupled to said mounting bracket by fasteners that extend through an upper surface of said hoist ring.

32. The injection molding apparatus as claimed in claim 31, wherein said mounting bracket is coupled to said distribution member by fasteners that mate with T-slots formed in said distribution member.

* * * * *